(12) United States Patent
Hibi

(10) Patent No.: US 7,363,635 B2
(45) Date of Patent: Apr. 22, 2008

(54) DISK DRIVE

(75) Inventor: Toshiharu Hibi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 435 days.

(21) Appl. No.: 11/127,318

(22) Filed: May 12, 2005

(65) Prior Publication Data

US 2005/0257231 A1 Nov. 17, 2005

(30) Foreign Application Priority Data

May 13, 2004 (JP) ............... P. 2004-143050

(51) Int. Cl.
*G11B 33/02* (2006.01)
*E05D 11/06* (2006.01)

(52) U.S. Cl. .................... 720/647; 16/357

(58) Field of Classification Search ........... 720/644, 720/646, 647; 360/99.02, 99.06; 16/357, 16/389; 49/254, 257, 258, 398; 312/325; 403/59, 61

See application file for complete search history.

(56) References Cited

U.S. PATENT DOCUMENTS 5,351,228 A * 9/1994 Kanno et al. ............ 720/647
5,748,595 A * 5/1998 Nakajima ................. 720/647
5,975,735 A * 11/1999 Schmitt ...................... 700/2
6,169,720 B1 * 1/2001 Kamemura et al. ...... 720/605
2002/0122370 A1 * 9/2002 Sasaki et al. ............ 369/75.1

FOREIGN PATENT DOCUMENTS

GB          2069037 A  *  8/1981
JP          2003-51181       2/2003

* cited by examiner

*Primary Examiner*—William Klimowicz
*Assistant Examiner*—Adam B Dravininkas
(74) *Attorney, Agent, or Firm*—Morgan Lewis & Bockius LLP

(57) ABSTRACT

A long aperture extending along the forward and backward movement direction is formed on each of the brackets, each of the supporting shafts is movably inserted into each of the long apertures, a spring shaft in parallel with one of the supporting shafts is protruded to the back of the front panel, a hold-down spring is formed in the door spring, the door spring is wound up by one of the supporting shafts, the free end of which is engaged with the tray door and also the hold-down spring is wound up by the spring shaft, the free end of which is engaged with the front panel, the forward-advanced tray pushes the tray door against the hold-down spring, by which the tray door is moved forward, and then the tray door is axially opened and moved around the supporting shaft against the door spring.

6 Claims, 11 Drawing Sheets

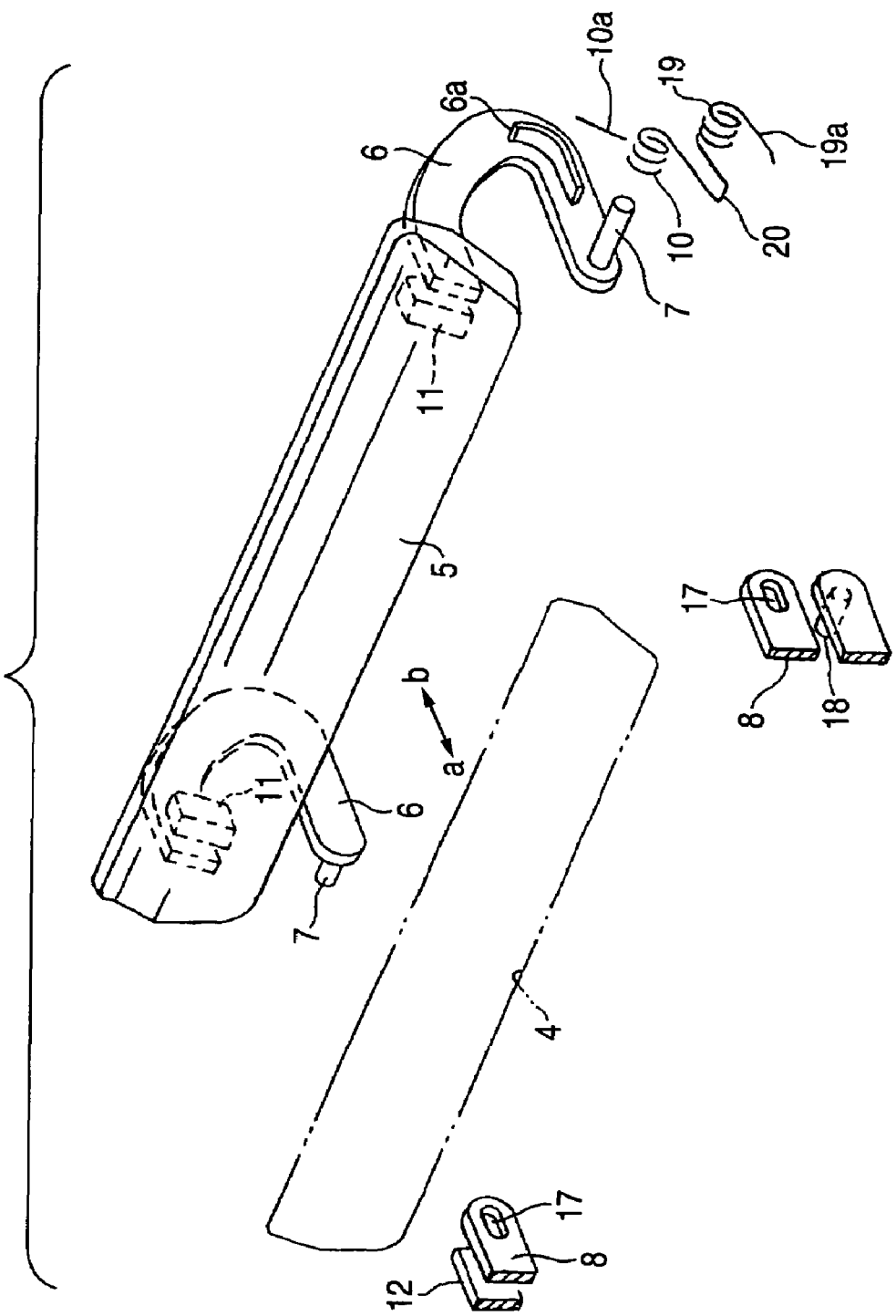

DISK DRIVE

BACKGROUND OF THE INVENTION

1. Field of the Invention

The present invention relates to a disk drive enabling a tray door for DVDs, etc., to smoothly open and close.

2. Description of the Related Art

A conventional disk drive is described in the JP-A-2003-51181, one example of which will be explained with reference to FIG. 8 through FIG. 11. In this conventional disk drive, a player main body 2 provided with a disk D-placing tray 1 which can advance forward and backward (a, b) is disposed inside a housing 3, a synthetic-resin made front panel 3a of the housing 3 is provided with a tray insertion slot 4 opposed to the tray 1, a pair of approximately U-shaped arms 6 are protruded bilaterally to the back of the synthetic-resin made tray door 5 for opening and closing the tray insertion slot 4, a supporting shaft 7 protruded to the front end of the respective arms 6 is inserted into a circular aperture 9 of a pair of brackets 8 bilaterally protruded to the back of the front panel 3a in such a manner that it can rotate in the directions of the arrows c and d, both ends of a door spring 10 wound up by one of the supporting shafts 7 are engaged with a projecting stopper 6a of one of the arms 6 and with the rear face of the front panel 3a, by which the tray door 5 is constantly given a force toward the direction of closing movement c and disposed on the tray insertion slot 4, and a cover plate 11 for the tray is protruded to both ends of the back plane of the tray door 5. In FIG. 8, 12 denotes a piece for preventing removal of the supporting shaft protruded to the back of the front panel 3a in close proximity to the other bracket 8, 13 denotes a power source button, 14 denote various operation buttons, and 15 denotes an ejection button.

Ejection operation will be described as follows. As shown by the solid line in FIG. 9A, when the ejection button 15 is depressed, with the tray insertion slot 4 closed by the tray door 5, the tray 1 is moved forward (a) based on the ejection signal, the advanced (a) tray 1 pushes a tray door 5 via the cover plate 11 against the door spring 10, by which the tray door 5 is axially opened and moved (d) around the supporting shaft 7 (refer to the virtual line shown in FIG. 9A). After the disk D is removed from the most-forward advanced (a) tray 1 and a new disk D is placed, the ejection button 15 is depressed, by which the tray 1 is moved backward (b) on the basis of the ejection signal and accommodated in the player main body 2 (refer to FIG. 9A), and the tray door 5 is approximately at the same time closed (c) by the door spring 10 to close the tray insertion slot 4.

In the above-described conventional structure, since the tray door 5 is only opened and closed (c, d) axially around the supporting shaft 7, it is necessary to provide a space a for the tray at the lower edge of the tray insertion slot 4 in front of the front panel 3a so that the tray door 5 does not contact with the front panel 3a at the tire of opening and closing operation (c, d) and the lower plane of the tray door is exposed outside due to the space α, thus making the appearance poor.

Further, as shown by the single dotted line and the double dotted line in FIG. 9B, there is a case where the tray door 5 is deviated from an original position due to manufacturing error or deformation, the periphery 5a of the tray door 5 is slightly away from the periphery of the tray insertion slot 4, and the tray insertion slot 4 cannot be reliably closed by the tray door 5. In this case, it is impossible to correct the positional deviation, therefore, dust may enter into the housing 3 from a clearance between the tray door 5 and the tray insertion slot 4.

SUMMARY OF THE INVENTION

An object of the present invention is to provide a disk drive which is excellent in appearance and can reliably open and close a tray insertion slot in consideration of the above-described defects.

In order to achieve the above object, according to a first aspect of the invention, there is provided a disk drive in which a player main body having a disk-placing tray which can advance forward and backward is disposed inside a housing, a tray insertion slot is provided on a front panel of the housing opposed to the tray, a pair of arms are protruded bilaterally to the back of the tray door for opening and closing the tray insertion slot, a supporting shaft protruded to the front end of the respective arms is rotatably inserted into a circular aperture of a pair of brackets bilaterally protruded to the back of the front panel, a door spring is provided, which constantly gives a force to the tray door in the direction of closing movement so as to position it at the tray insertion slot, the forward-advanced tray pushes the tray door against the door spring, by which the tray door is axially opened and moved around the supporting shaft, wherein in place of the circular aperture, a long aperture horizontally extending along the forward and backward movement direction is formed on each of the brackets, each of the supporting shafts is movably inserted into each of the long apertures, a spring shaft in parallel with one of the supporting shafts below is integrally protruded to the back of the front panel, a hold-down spring is integrally formed in the door spring, the door spring is wound up by one of the supporting shafts, the free end of which is engaged with one of the arms and also the hold-down spring is wound up by the spring shaft, the free end of which is engaged with the front panel, a force given by the hold-down spring is designed to be smaller than that given by the door spring, the forward-advanced tray pushes the tray door against the hold-down spring, by which the tray door is horizontally moved forward, and then the tray door is axially opened and moved around the supporting shaft against the door spring.

According to a second aspect of the invention, there is provided a disk drive, in which a player main body having a disk-placing tray which can move forward and backward is disposed inside a housing, a tray insertion slot is provided at the front panel of the housing opposed to the tray, a pair of arms are protruded bilaterally to the back of the tray door for opening and closing the tray insertion slot, a supporting shaft protruded to the front end of the respective arms is rotatably inserted into a circular aperture of a pair of brackets bilaterally protruded to the back of the front panel, a door spring is provided, which constantly gives a force to the tray door in the direction of closing movement so as to position it at the tray insertion slot, the forward-advanced tray pushes the tray door against the door spring, by which the tray door is axially opened and moved around the supporting shaft, wherein in place of the circular aperture, a long aperture extending obliquely upward toward the forward movement direction is formed on each of the brackets, each of the supporting shafts is movably inserted into each of the long apertures, a spring shaft in parallel with one of the supporting shafts below is integrally protruded to the back of the front panel, a hold-down spring is integrally formed in the door spring, the door spring is wound up by one of the supporting shafts, the free end of which is engaged with one of the arms and also the hold-down spring is wound up by the spring shaft, the free end of which is engaged with the front panel, a force given by the hold-down spring is designed to be smaller than that given by the door spring, the forward-advanced tray pushes the tray door against the hold-down spring, by which the tray door is moved forward obliquely upward, and then the tray door is axially opened and moved around the supporting shaft against the door spring.

According to a third aspect of the invention, there is provided a disk drive, in which a player main body having a disk-placing tray which can move forward and backward is disposed inside a housing, a tray insertion slot is provided at the front panel of the housing opposed to the tray, a pair of arms are protruded bilaterally to the back of the tray door for opening and closing the tray insertion slot, a supporting shaft protruded to the front end of the respective arms is supported on a pair of brackets bilaterally protruded to the back of the front panel, a door spring is provided, which constantly gives a force to the tray door in the direction of closing movement so as to position it at the tray insertion slot, the forward-advanced tray pushes the tray door against the door spring, by which the tray door is axially opened and moved around the supporting shaft, wherein a long aperture is formed on each of the brackets, each of the supporting shafts is movably inserted into each of the long apertures, a hold-down spring which gives a force to the tray door in the direction of backward movement is provided via one of the supporting shafts, a force given by the hold-down spring is designed to be smaller than that given by the door spring, the forward-advanced tray pushes the tray door against the hold-down spring, by which the tray door is moved forward, and then the tray door is axially opened and moved around the supporting shaft against the door spring.

According to a fourth aspect of the invention in the third aspect of the invention, there is provided a disk drive, wherein, a spring shaft in parallel with one or the other of the supporting shafts is integrally protruded to the back of the front panel, a hold-down spring is integrally formed in the door spring, the door spring is wound up by one or the other supporting shafts, the free end of which is engaged with one of the arms and the hold-down spring is wound up by the spring shaft, the free end of which is engaged with the front panel.

According to a fifth aspect of the invention in the third or the fourth aspect of the invention, there is provided a disk drive, wherein the long aperture horizontally extends along the forward and backward movement direction.

According to a sixth aspect of the invention in the third or the fourth aspect of the invention, there is provided a disk drive, wherein the long aperture extends obliquely upward toward the forward movement direction.

According to the first aspect of the invention, a tray door is allowed to advance forward or backward along a long aperture near a tray insertion slot, thereby removing the necessity for forming a space for the tray at the lower edge of the tray insertion slot in front of the front panel, which is required by a conventional disk drive, and making it possible to keep the appearance favorable to conceal the lower face of the tray door so as not to be exposed to the outside.

Further, even in a case where the tray door is deviated from an original position due to manufacturing error or deformation and a slight clearance is generated between the tray door and the tray insertion slot in a conventional disk drive, the supporting shaft slightly deforms along the long aperture against the hold-down spring to correct the deviation. Therefore, the periphery of the tray door is reliably and closely fitted to a tray insertion slot so that no clearance is generated between them, thereby preventing dust etc., from entering into the housing.

In addition, since the hold-down spring is integrally formed in the door spring, it is possible to fix these springs to one of the supporting shafts and the spring shaft more easily and swiftly than when both of these springs are fixed separately. In this case, necessary parts are smaller in number, which results in a reduction in production costs.

In this instance, since the long aperture extends horizontally along the forward and backward movement direction, it is possible to open and close the tray door smoothly and horizontally so as not to be caught by the tray insertion slot.

According to the second aspect of the invention, similar effects can be obtained as those obtained by the first aspect of the invention. Further, since the long aperture extends obliquely upward toward the forward movement direction in particular, a clearance between both the upper and lower edges of the tray door and the tray insertion slot is positioned obliquely upward and behind from the front plane, thereby making it possible to improve the appearance.

According to the third aspect of the invention, the tray door is allowed to move forward and backward along the long aperture near the tray insertion slot, thereby removing the necessity for forming a space for the tray at the lower edge of the tray insertion slot in front of the front panel, which is otherwise required by a conventional disk drive. Further, the lower plane of the tray door is recessed so as not to be exposed to the outside, by which the appearance can be kept favorable.

Further, even in a case where the tray door is deviated from an original position due to manufacturing error or deformation and a slight clearance is generated between the tray door and the tray insertion slot in a conventional disk drive, the supporting shaft slightly deforms along the long aperture against the hold-down spring to correct the deviation. Therefore, the periphery of the tray door is reliably and closely fitted to a tray insertion slot so that no clearance is generated between them, thereby preventing dust etc., from entering into the housing.

According to the fourth aspect of the invention, since the hold-down spring is integrally formed in the door spring, it is possible to fix these springs to one of the supporting shafts and the spring shaft more easily and swiftly than when both of these springs are fixed separately. In this case, necessary parts are smaller in number, which results in a reduction in production costs.

According to the fifth aspect of the invention, since the long aperture horizontally extends along the forward and backward movement direction, it is possible to open and close the tray door smoothly and horizontally so as not to be caught by the tray insertion slot.

According to the sixth aspect of the invention, similar effects can be obtained as those obtained by the fifth aspect of the invention, since the long aperture extends obliquely upward toward the forward movement direction. Further, a clearance between both the upper and lower edges of the tray door and the tray insertion slot is positioned obliquely upward and behind from the front plane, thereby making it possible to improve the appearance.

BRIEF DESCRIPTION OF THE DRAWINGS

These and other objects and advantages of this invention will become more fully apparent from the following detailed description taken with the accompanying drawings in which;

FIG. 3 is an exploded perspective view showing the major part;

DETAILED DESCRIPTION OF THE PREFERRED EMBODIMENTS

Figure 1:
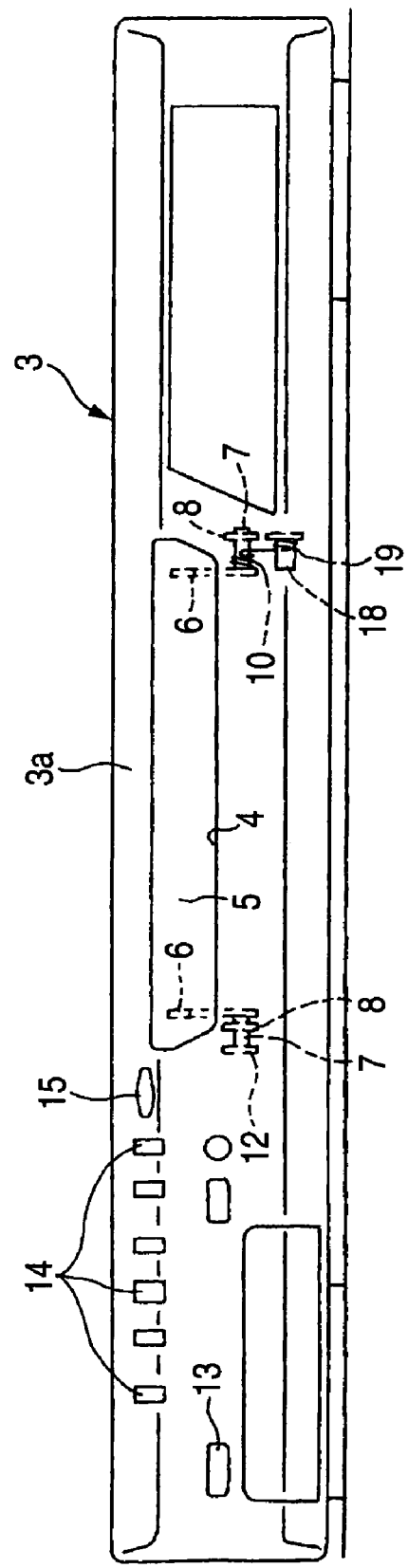
FIG. 1 is a front view illustrating the DVD-type disk drive, which is the first embodiment of the present invention.

FIG. 1 through FIG. 5 show the first embodiment of the present invention, namely, a DVD-typed is disk drive, wherein a long aperture 17 horizontally extending along the forward and backward movement direction (a, b) is formed on each of brackets 8, each of supporting shafts 7 is movably inserted into each of the long apertures 17, a spring shaft 18 in parallel with one of the supporting shafts 7 below is integrally protruded to the back of the front pane 3a, a hold-down spring 19 is integrally formed in a door spring 10, the door spring 10 is wound up by one of the supporting shafts 7, the free end 10a of which is engaged with a projecting stopper 6a of the arm 6 and also the hold-down spring 19 is wound up by the spring shaft 18, the free end 19a of which is engaged with the back plane of the front panel 3a. Since the construction other than that described above is the same as that illustrated in FIG. 8 to FIG. 11, the same symbols are given to the same parts to omit description.

Figure 4A:
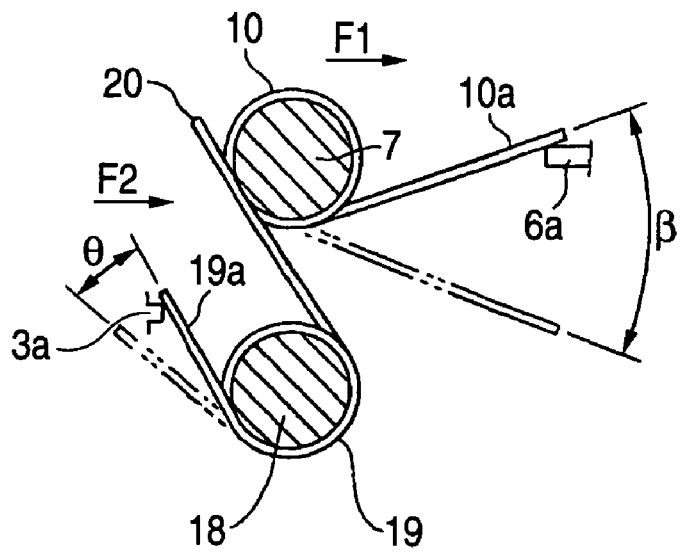
FIG. 4A is a lateral view illustrating a state that the spring is set.
Figure 4B:
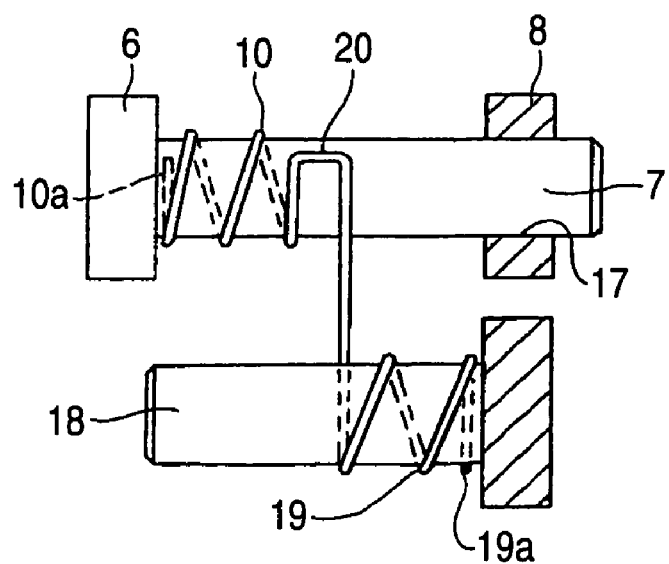
FIG. 4B is a front view showing the same state.

As shown in FIGS. 4A and 4B, the door spring 10 and the hold-down spring 19 are made of one spring material, the spring material is folded at the center in an approximately U shape so as to form a common edge 20, and both sides of the spring material are wound up in a coil form, with the common edge 20 held between these sides, by which the door spring 10 and the hold-down spring 19 are formed.

Further, in a case where these springs 10 and 19 are set between the projecting stopper 6a of one of the arms 6 and the front panel 3a in transition from a state where no load is applied to these springs 10 and 19 (refer to the virtual line shown in FIG. 4A), the elastic displacement angle θ of the free end 19a of the hold-down spring 19 is made smaller than elastic displacement angle β of the free end 10a of the door spring 10 (refer to the solid line shown in FIG. 4A), by which a force given by the hold-down spring 19 (F2) is set smaller than a force given by the door spring 10 (F1) or (F1>F2).

According to the above-described construction, since the hold-down spring 19 is integrally formed in the door spring 107 it is possible to fix these springs 10 and 19 to one of the supporting shafts 7 and the spring shaft 18 more easily and swiftly than when both of these springs 10 and 19 are fixed separately. In this case, necessary parts are smaller in number, which results in a reduction in production costs.

Figure 2A:
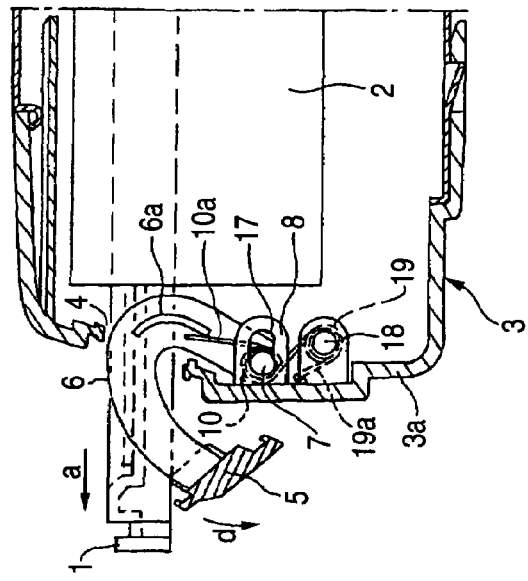
FIG. 2A is a longitudinal sectional view showing the early stage of the ejection operation.
Figure 2B:
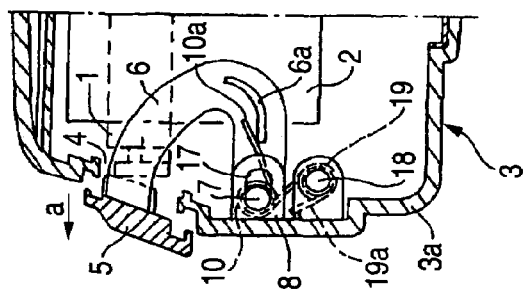
FIG. 2B is a longitudinal sectional view showing the middle stage of the same operation.
Figure 2C:
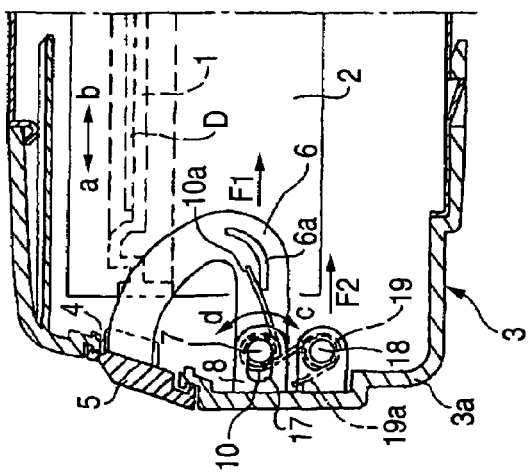
FIG. 2C is a longitudinal sectional view showing the latter stage.
Figure 2D:
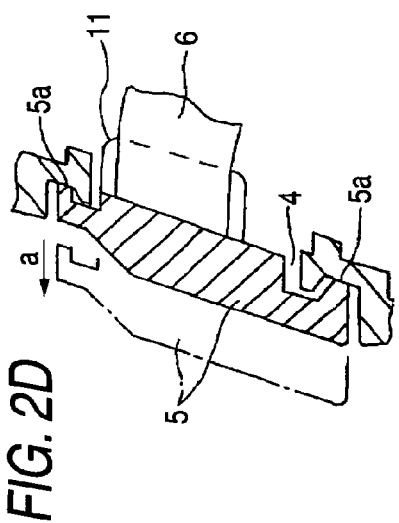
FIG. 2D is an enlarged longitudinal sectional view showing the major part of the disk drive.

Ejection operation will be described as follows. As shown in FIG. 2A when the ejection button 15 is depressed with the tray insertion slot 4 closed by the tray door 5, the tray 1 is moved forward (a) based on the ejection signal, the thus advanced (a) tray 1 pushes the tray door 5 via the cover plate 11 against the hold-down spring 19, by which each of the supporting shafts 7 is moved forward inside the long aperture 17 and the tray door 5 is moved forward (a) horizontally as shown in FIG. 2B. Then, as shown in FIG. 2C the tray door 5 is axially opened and moved (d) around the supporting shaft 7 against the door spring 10.

Figure 5:
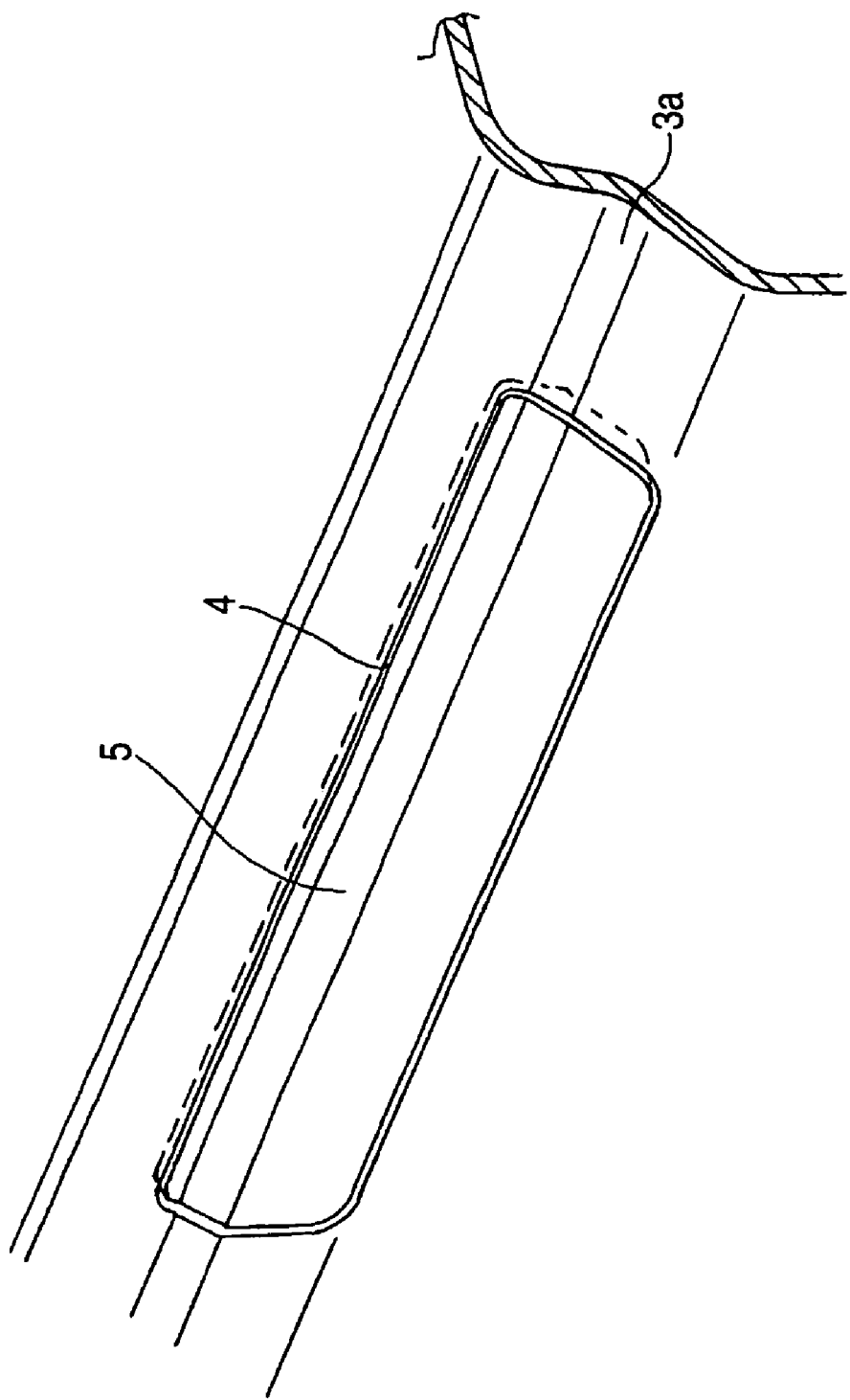
FIG. 5 is a front perspective view illustrating an area in the vicinity of the tray door.

After the disk D is removed from the most-forward advanced (a) tray 1 and a new disk D is placed, the ejection button 15 is depressed, by which the tray 1 is moved backward (b) on the basis of the ejection signal and accommodated in the player main body 2, the tray door 5 is approximately at the same time closed (c) by the door spring 10 and also moved backward (b) horizontally to close the tray insertion slot 4 (refer to FIG. 2A), According to the above construction, the tray door 5 is allowed to move forward or backward (a, b) along the long aperture 17 near the tray insertion slot 4 (refer to FIG. 2B), thereby removing the necessity for forming a space a for the tray (refer to FIG. 11) at the lower edge of the tray insertion slot 4 in front of the front panel 3a, which is required by a conventional disk drive, and making it possible to keep the appearance favorable to conceal the lower face of the tray door 5 so as not to be exposed to the outside (refer to FIG. 5).

Figure 9A:
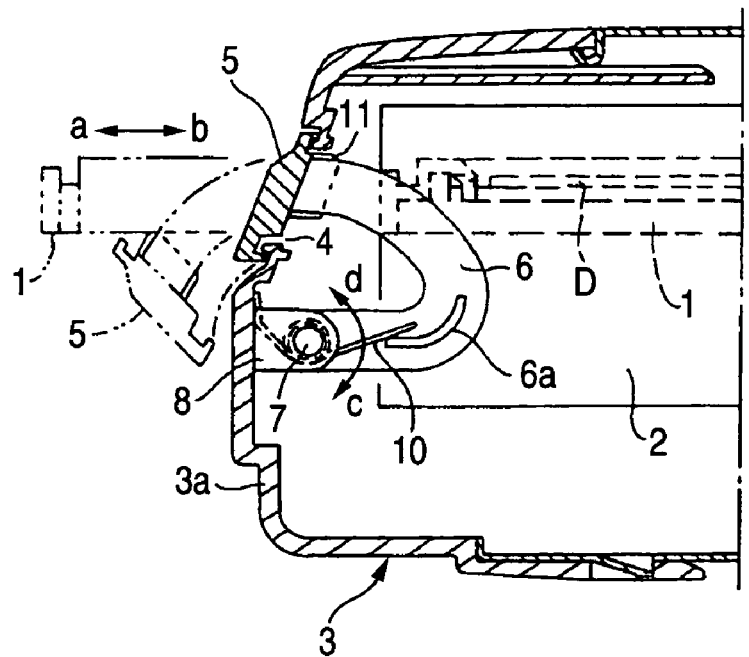
FIG. 9A is a longitudinal sectional view illustrating the ejection operation.
Figure 9B:
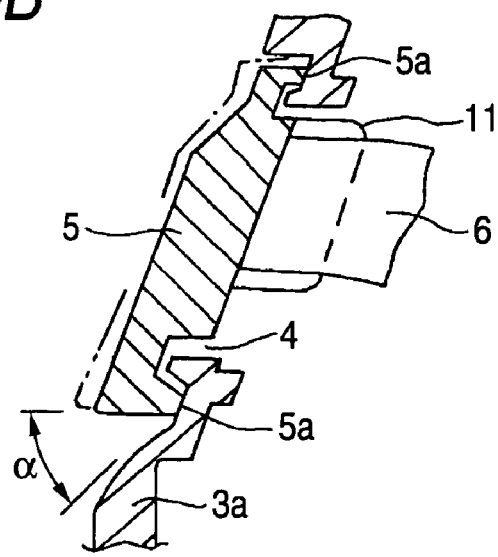
FIG. 9B is an enlarged longitudinal sectional view showing the major parts.
Figure 10:
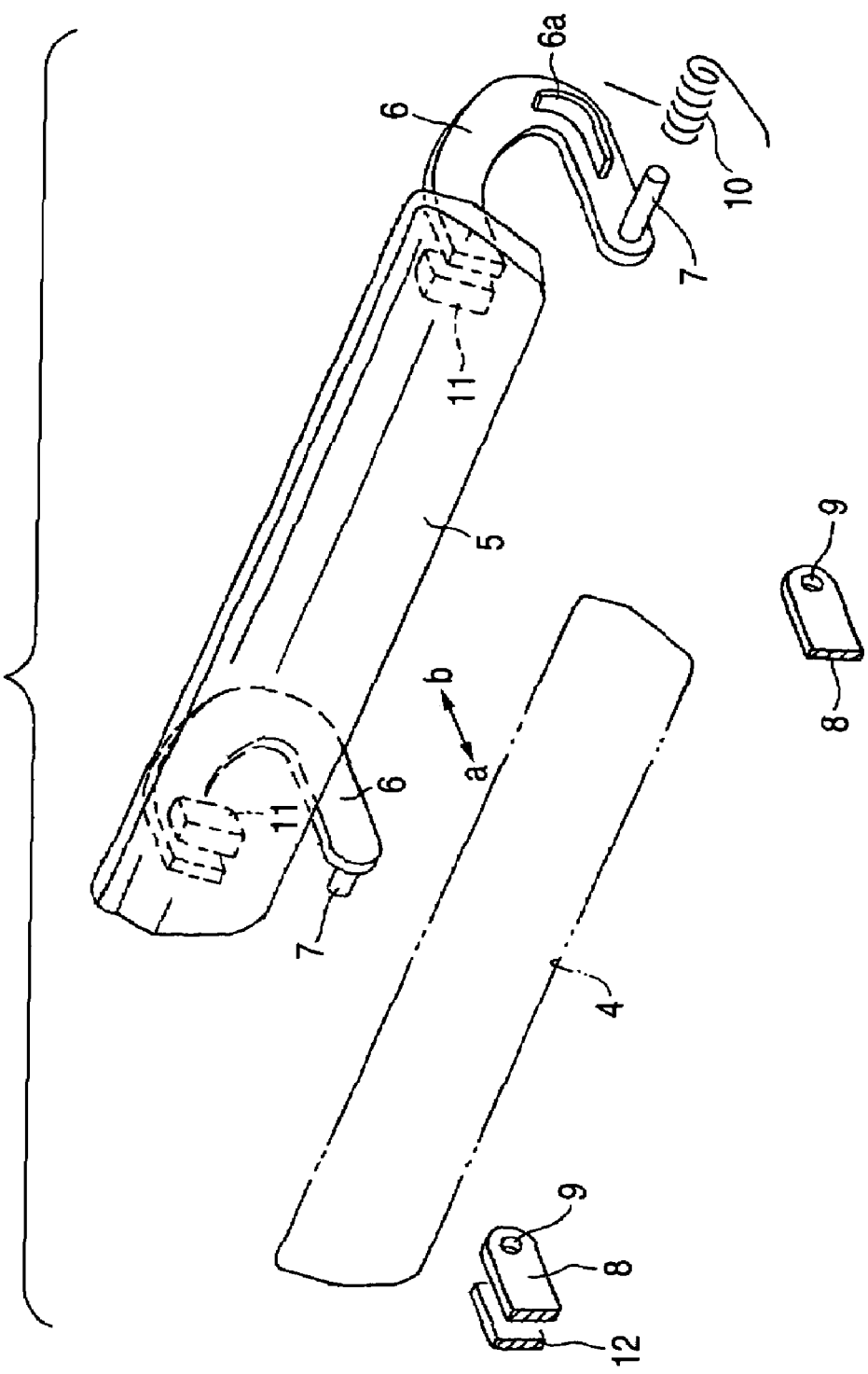
FIG. 10 is an exploded perspective view showing the major part of the major part.
Figure 11:
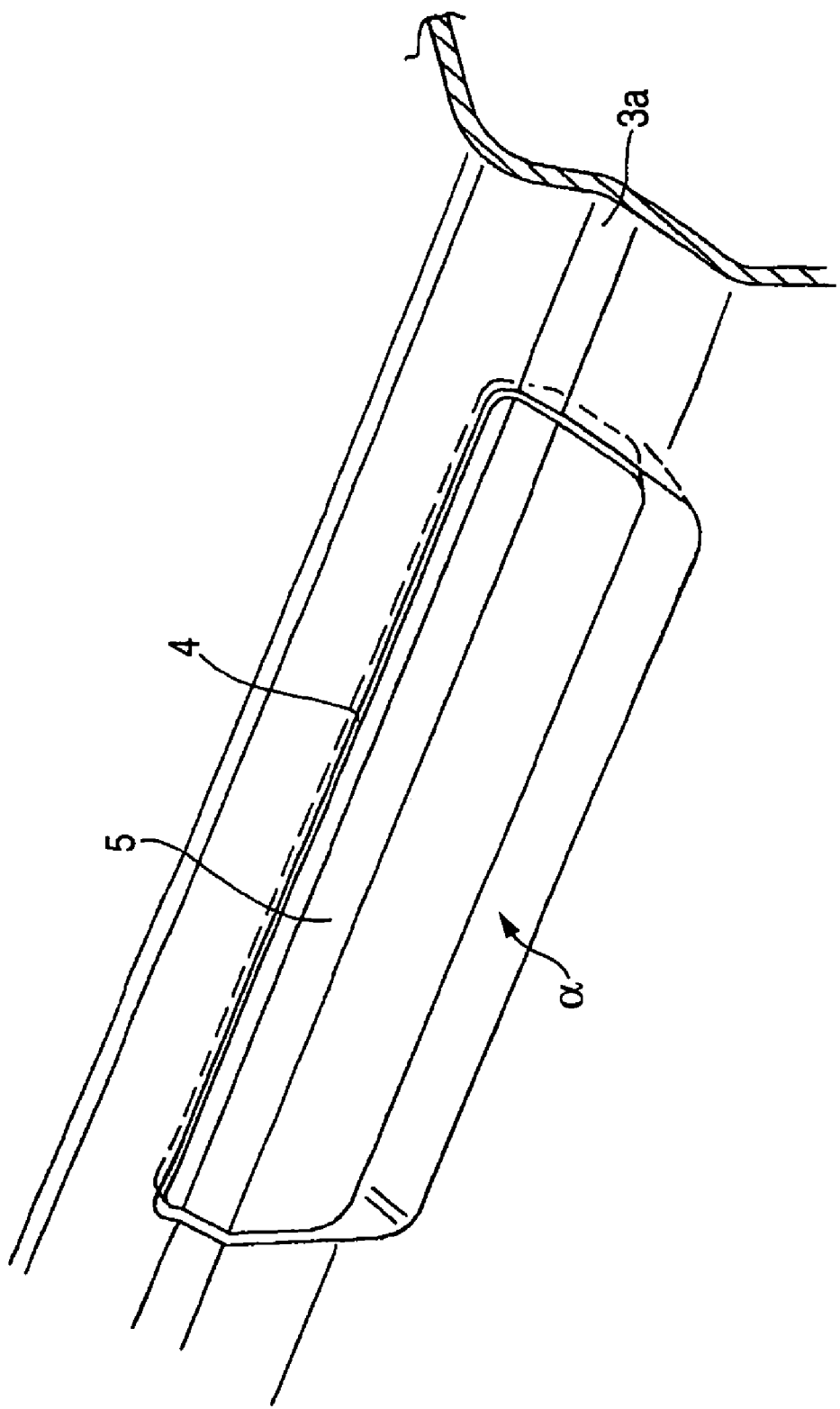
FIG. 11 is a front perspective view of an area in the vicinity of the tray door.

Further, even in a case where the tray door 5 is deviated from an original position due to manufacturing error or deformation and a slight clearance is generated between the tray door 5 and the tray insertion slot 4 in a conventional disk drive (refer to the part shown by the single dotted line and the double dotted line in FIG. 9B), the supporting shaft 7 slightly deforms along the long aperture 17 against the hold-down spring 19 to correct the deviation. Therefore, the periphery 5a of the tray door 5 is reliably and closely fitted to the tray insertion slot 4 so that no clearance is generated between them, thereby preventing dust etc., from entering into the housing 3 (refer to FIG. 2D).

In this instance, since the long aperture 17 extends horizontally along the forward and backward movement direction (a, b), it is possible to open and close (c, d) the tray door 5 smoothly and horizontally so as not to be caught by the tray insertion slot 4.

Figure 6A:
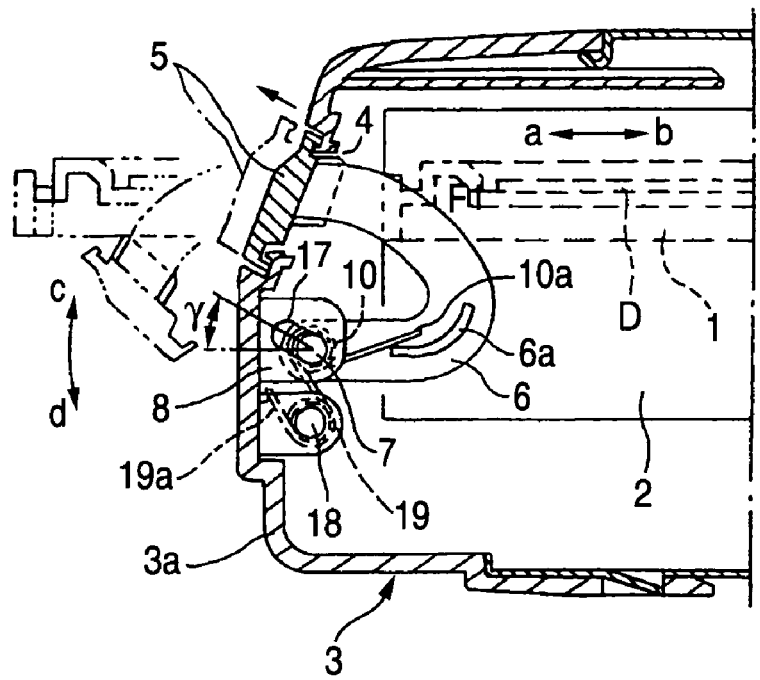
FIG. 6A is a longitudinal sectional view illustrating the DVD-type disk drive of the second embodiment of the present invention.
Figure 6B:
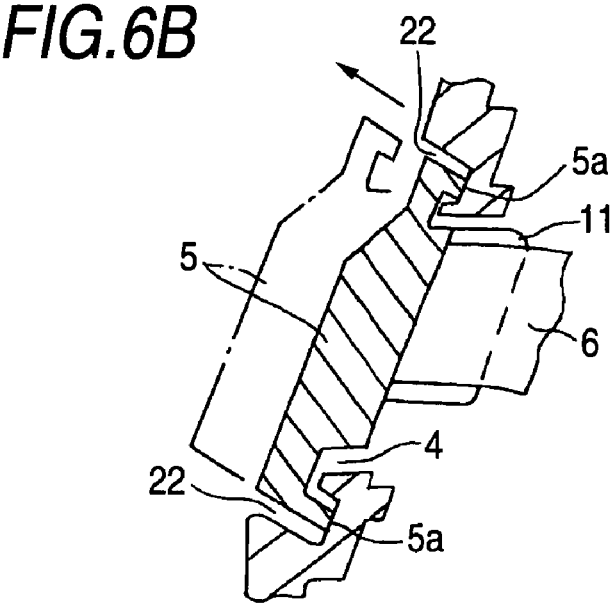
FIG. 6B is an enlarged longitudinal sectional view showing the major parts of the disk drive.

FIGS. 6A and 6B show the second embodiment of the present invention, a DVD-type disk drive, in which the long aperture 17 extends obliquely upward at a predetermined angle γ (for example, 20 to 45°) toward the forward movement direction (a). Since the construction other than that described above is the same as that illustrated in FIG. 1 to FIG. 5, the same symbols are given to the same parts to omit description.

According to the above construction, this embodiment can provide substantially similar effects as those obtained by the first embodiment. Further, since the long aperture 17 extends obliquely upward toward the forward movement direction (a) in particular, the clearance 22 between both the upper and lower edges of the tray door 5 and the tray insertion slot 4 is positioned obliquely upward and behind from the front plane, thereby making it possible to improve the appearance.

Figure 7:
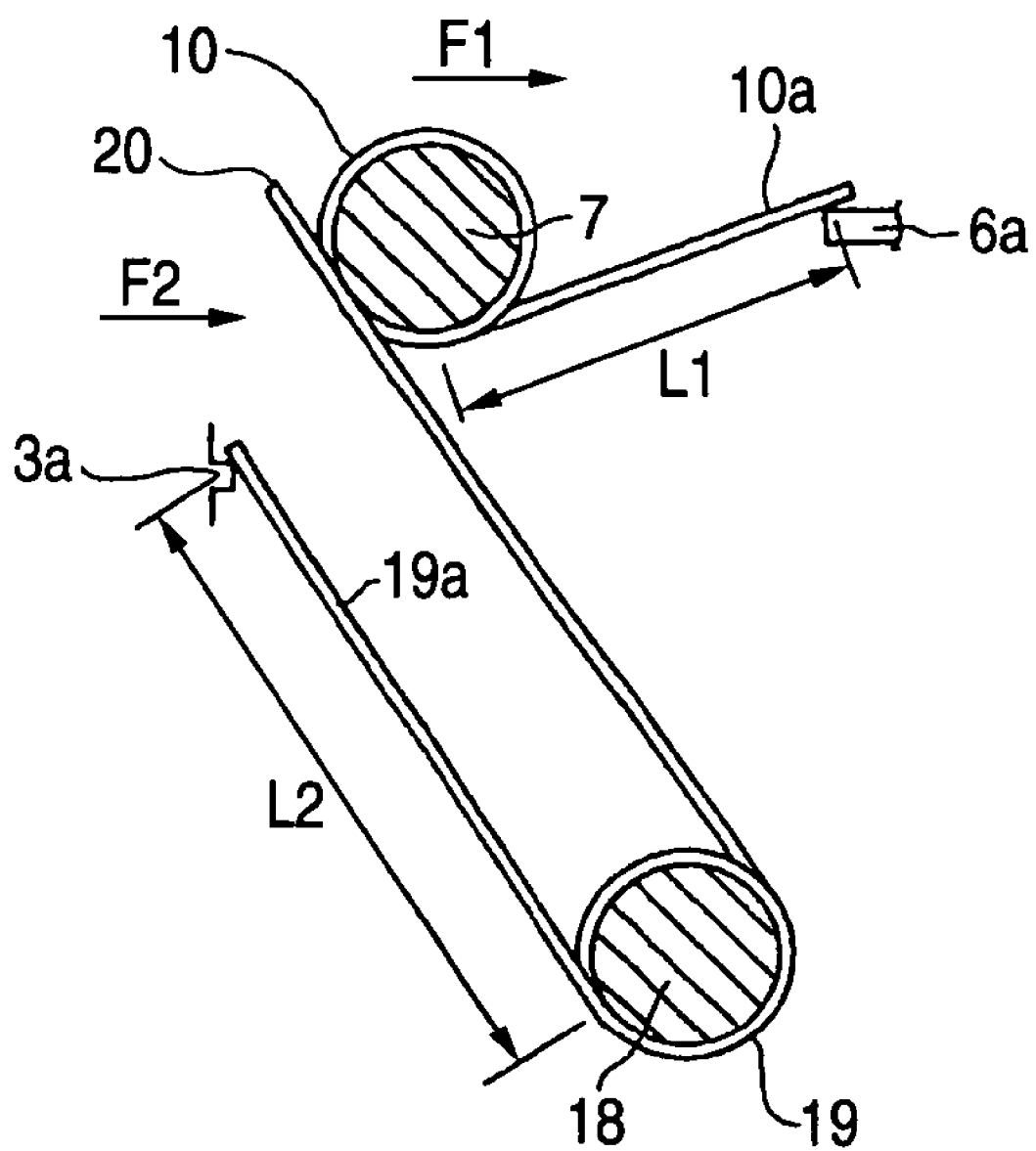
FIG. 7 is a lateral view illustrating a state that the spring is set in the DVD-type disk drive, which is the third embodiment of the present invention.
Figure 8:
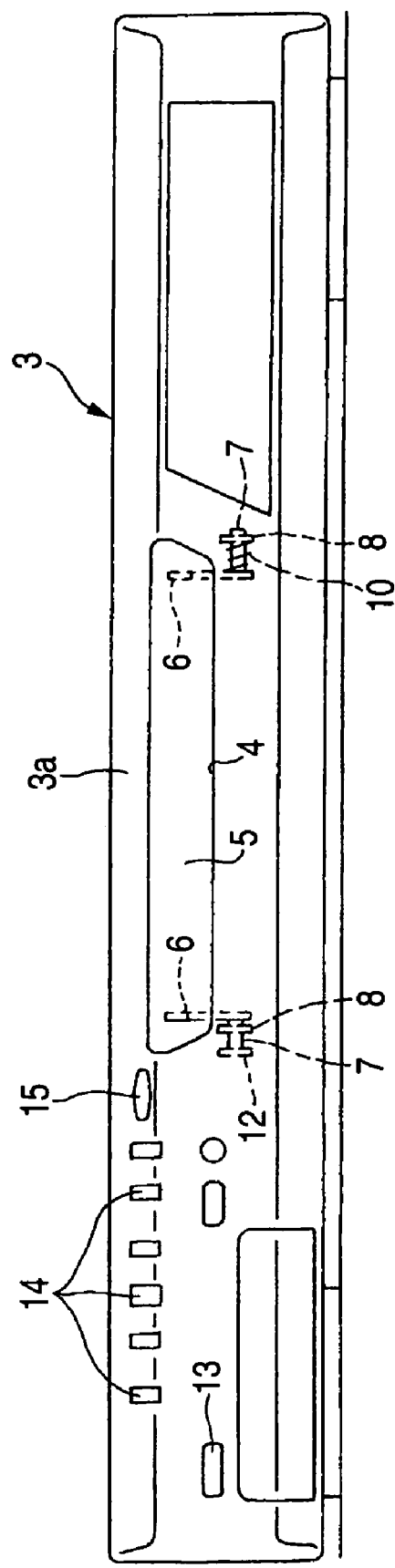
FIG. 8 is a front view showing the conventional example.

In each of the above-described embodiments, since a force given by the hold-down spring 19 (F2) is designed to be smaller than a force given by the door spring 10 (F1), free ends 10a and 19a of these springs 10 and 19 are adjusted for elastic displacement angles β and θ. However, the present invention shall not be restricted thereto and, as shown in FIG. 7, a length of the free end 19a of the hold-down spring 19 (L2) may be greater than that of the free end 10a of the door spring 10 (L1) (Third embodiment).

In the above embodiments, description was made for the DVD-type disk drive, as an example. However, the present invention shall not be restricted thereto and is also applicable to various types of electrical appliances such as DVD-integrated video cassette recorders.

What is claimed is:

1. A disk drive in which a player main body having a disk-placing tray which can advance forward and backward is disposed inside a housing, and a tray insertion slot is provided on a front panel of the housing opposed to the tray, the disk drive comprising:
   a pair of arms protruded bilaterally to the back of a tray door that are for opening and closing the tray insertion slot;
   a long aperture respectively formed on a pair of brackets;
   a supporting shaft protruded to the front end of the respective arms, and rotatably inserted into the long aperture of the pair of brackets bilaterally protruded to the back of the front panel;
   a door spring for constantly giving a force to the tray door in the direction of closing movement so as to position the tray door at the tray insertion slot;
   a spring shaft in parallel with one of the supporting shafts below integrally protruded to the back of the front panel; and
   a hold-down spring is integrally formed in the door spring, wherein:
   the forward-advanced tray pushes the tray door against the door spring, by which the tray door is axially opened and moved around the supporting shaft;
   the long aperture horizontally extends along the forward and backward movement direction;
   each of the supporting shafts is movably inserted into each of the long apertures;
   the door spring is wound up by one of the supporting shafts, the free end of which is engaged with one of the arms and also the hold-down spring is wound up by the spring shaft, and the free end of which is engaged with the front panel; and
   a force given by the hold-down spring is designed to be smaller than that given by the door spring, the forward-advanced tray pushes the tray door against the hold-down spring, by which the tray door is moved forward horizontally, and then the tray door is axially opened and moved around the supporting shaft against the door spring.

2. A disk drive in which a player main body having a disk-placing tray which can advance forward and backward is disposed inside a housing, and a tray insertion slot is provided on a front panel of the housing opposed to the tray, the disk drive comprising:
   a pair of arms protruded bilaterally to the back of a tray door that are for opening and closing the tray insertion slot;
   a long aperture respectively formed on a pair of brackets;
   a supporting shaft protruded to the front end of the respective arms, and rotatably inserted into the long aperture of the pair of brackets bilaterally protruded to the back of the front panel;
   a door spring for constantly giving a force to the tray door in the direction of closing movement so as to position the tray door at the tray insertion slot;
   a spring shaft in parallel with one of the supporting shafts below integrally protruded to the back of the front panel; and
   a hold-down spring is integrally formed in the door spring, wherein:
   the long aperture extends obliquely upward toward the forward movement direction is formed on each of the brackets;
   each of the supporting shafts is movably inserted into each of the long apertures;
   the door spring is wound up by one of the supporting shafts, the free end of which is engaged with one of the arms and also the hold-down spring is wound up by the spring shaft, and the free end of which is engaged with the front panel; and
   a force given by the hold-down spring is designed to be smaller than that given by the door spring, the forward-advanced tray pushes the tray door against the hold-down spring, by which the tray door is moved forward obliquely upward, and then the tray door is axially opened and moved around the supporting shaft against the door spring.

3. A disk drive in which a player main body having a disk-placing tray which can advance forward and backward is disposed inside a housing, and a tray insertion slot is provided on a front panel of the housing opposed to the tray, the disk drive comprising:
   a pair of arms protruded bilaterally to the back of a tray door that are for opening and closing the tray insertion slot;
   a supporting shaft protruded to the front end of the respective arms, and supported on a pair of brackets bilaterally protruded to the back of the front panel;
   a door spring for constantly giving a force to the tray door in the direction of closing movement so as to position the tray door at the tray insertion slot;
   a long aperture formed on each of the brackets; and
   a hold-down spring for giving a force to the tray door in the direction of backward movement, wherein;
   the forward-advanced tray pushes the tray door against the door spring, by which the tray door is axially opened and moved around the supporting shaft;
   each of the supporting shafts is movably inserted into each of the long apertures;
   the hold-down spring is provided via one of the supporting shafts; and
   a force given by the hold-down spring is designed to be smaller than that given by the door spring, the forward-advanced tray pushes the tray door against the hold-down spring, by which the tray door is moved forward, and then the tray door is axially opened and moved around the supporting shaft against the door spring.

4. The disk drive according to claim 3, further comprising a spring shaft in parallel with one of the supporting shafts integrally protruded to the back of the front panel, wherein
   the hold-down spring is integrally formed in the door spring, the door spring is wound up by one of the supporting shafts, the free end of which is engaged with one of the arms and also the hold-down spring is wound up by the spring shaft, and the free end of which is engaged with the front panel.

5. The disk drive according to claim 3, wherein the long aperture horizontally extends along the forward and backward movement direction.

6. The disk drive according to claim 3, wherein the long aperture extends obliquely upward toward the forward movement direction.

* * * * *